United States Patent
Shokrollahi

(10) Patent No.: US 10,324,876 B2
(45) Date of Patent: Jun. 18, 2019

(54) ORTHOGONAL DIFFERENTIAL VECTOR SIGNALING CODES WITH EMBEDDED CLOCK

(71) Applicant: Kandou Labs, S.A., Lausanne (CH)

(72) Inventor: Amin Shokrollahi, Préverenges (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 16/107,839

(22) Filed: Aug. 21, 2018

(65) Prior Publication Data

US 2018/0357191 A1    Dec. 13, 2018

Related U.S. Application Data

(63) Continuation of application No. 14/952,491, filed on Nov. 25, 2015, now Pat. No. 10,055,372.

(51) Int. Cl.
| | |
|---|---|
| *G06F 13/36* | (2006.01) |
| *G06F 13/362* | (2006.01) |
| *G06F 13/40* | (2006.01) |
| *H04L 25/02* | (2006.01) |
| *H04L 25/49* | (2006.01) |

(52) U.S. Cl.
CPC ........ *G06F 13/362* (2013.01); *G06F 13/4068* (2013.01); *H04L 25/0272* (2013.01); *H04L 25/49* (2013.01); *Y02D 10/14* (2018.01); *Y02D 10/151* (2018.01)

(58) Field of Classification Search
CPC ... G06F 13/364; G06F 13/36; Y02B 60/1228; H03M 13/1102; H03M 13/3761; H04L 25/0272
See application file for complete search history.

(56) References Cited

U.S. PATENT DOCUMENTS

| | | |
|---|---|---|
| 1,005,537 A | 10/1911 | Goss |
| 3,196,351 A | 7/1965 | Slepian |
| 4,163,258 A | 7/1979 | Ebihara |
| 4,181,967 A | 1/1980 | Nash |
| 4,206,316 A | 6/1980 | Burnsweig |
| 4,414,512 A | 11/1983 | Nelson |
| 4,486,739 A | 12/1984 | Franaszek |
| 4,499,550 A | 2/1985 | Ray, III |
| 4,772,845 A | 9/1988 | Scott |

(Continued)

FOREIGN PATENT DOCUMENTS

| | | |
|---|---|---|
| CN | 1671092 | 9/2005 |
| CN | 1864346 | 11/2006 |

(Continued)

OTHER PUBLICATIONS

Jiang, A., et al., "Rank Modulation for Flash Memories", IEEE Transactions of Information Theory, Jun. 2006, vol. 55, No. 6, pp. 2659-2673.

(Continued)

*Primary Examiner* — Brian T Misiura
(74) *Attorney, Agent, or Firm* — Invention Mine LLC

(57) ABSTRACT

Orthogonal differential vector signaling codes are described which support encoded sub-channels allowing transport of distinct data and clocking signals over the same transport medium. Embodiments are described which are suitable for implementation in both conventional high-speed CMOS and DRAM integrated circuit processes.

20 Claims, 11 Drawing Sheets

(56) References Cited

U.S. PATENT DOCUMENTS

| | | |
|---|---|---|
| 4,864,303 A | 9/1989 | Ofek |
| 4,974,211 A | 11/1990 | Corl |
| 5,053,974 A | 10/1991 | Penz |
| 5,150,384 A | 9/1992 | Cahill |
| 5,166,956 A | 11/1992 | Baltus |
| 5,168,509 A | 12/1992 | Nakamura |
| 5,266,907 A | 11/1993 | Dacus |
| 5,311,516 A | 5/1994 | Kuznicki |
| 5,331,320 A | 7/1994 | Cideciyan |
| 5,412,689 A | 5/1995 | Chan |
| 5,449,895 A | 9/1995 | Hecht |
| 5,461,379 A | 10/1995 | Weinman |
| 5,511,119 A | 4/1996 | Lechleider |
| 5,528,198 A | 6/1996 | Baba |
| 5,553,097 A | 9/1996 | Dagher |
| 5,566,193 A | 10/1996 | Cloonan |
| 5,629,651 A | 5/1997 | Mizuno |
| 5,659,353 A | 8/1997 | Kostreski |
| 5,727,006 A | 3/1998 | Dreyer |
| 5,802,356 A | 9/1998 | Gaskins |
| 5,825,808 A | 10/1998 | Hershey |
| 5,856,935 A | 1/1999 | Moy |
| 5,875,202 A | 2/1999 | Venters |
| 5,982,954 A | 11/1999 | Delen |
| 6,005,895 A | 12/1999 | Perino |
| 6,084,883 A | 7/2000 | Norrell |
| 6,119,263 A | 9/2000 | Mowbray |
| 6,154,498 A | 11/2000 | Dabral |
| 6,175,230 B1 | 1/2001 | Hamblin |
| 6,188,497 B1 | 2/2001 | Franck |
| 6,278,740 B1 | 8/2001 | Nordyke |
| 6,307,906 B1 | 10/2001 | Tanji |
| 6,316,987 B1 | 11/2001 | Dally |
| 6,317,465 B1 | 11/2001 | Akamatsu |
| 6,359,931 B1 | 3/2002 | Perino |
| 6,380,783 B1 | 4/2002 | Chao et al. |
| 6,389,091 B1 | 5/2002 | Yamaguchi |
| 6,404,820 B1 | 6/2002 | Postol |
| 6,417,737 B1 | 7/2002 | Moloudi |
| 6,424,630 B1 | 7/2002 | Ang |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino |
| 6,509,773 B2 | 1/2003 | Buchwald |
| 6,522,699 B1 | 2/2003 | Anderson |
| 6,556,628 B1 | 4/2003 | Poulton |
| 6,621,427 B2 | 9/2003 | Greenstreet |
| 6,621,945 B2 | 9/2003 | Bissessur |
| 6,650,638 B1 | 11/2003 | Walker |
| 6,661,355 B2 | 12/2003 | Cornelius |
| 6,686,879 B2 | 2/2004 | Shattil |
| 6,690,739 B1 | 2/2004 | Mui |
| 6,717,478 B1 | 4/2004 | Kim |
| 6,766,342 B2 | 7/2004 | Kechriotis |
| 6,839,429 B1 | 1/2005 | Gaikwad |
| 6,865,234 B1 | 3/2005 | Agazzi |
| 6,865,236 B1 | 3/2005 | Terry |
| 6,876,317 B2 | 4/2005 | Sankaran |
| 6,898,724 B2 | 5/2005 | Chang |
| 6,927,709 B2 | 8/2005 | Kiehl |
| 6,954,492 B1 | 10/2005 | Williams |
| 6,963,622 B2 | 11/2005 | Eroz |
| 6,973,613 B2 | 12/2005 | Cypher |
| 6,976,194 B2 | 12/2005 | Cypher |
| 6,982,954 B2 | 1/2006 | Dhong |
| 6,990,138 B2 | 1/2006 | Bejjani |
| 6,993,311 B2 | 1/2006 | Li |
| 6,999,516 B1 | 2/2006 | Rajan |
| 7,023,817 B2 | 4/2006 | Kuffner |
| 7,039,136 B2 | 5/2006 | Olson |
| 7,053,802 B2 | 5/2006 | Cornelius |
| 7,072,387 B1 | 7/2006 | Betts |
| 7,075,996 B2 | 7/2006 | Simon |
| 7,080,288 B2 | 7/2006 | Ferraiolo |
| 7,082,557 B2 | 7/2006 | Schauer |
| 7,120,198 B1 | 10/2006 | Dafesh |
| 7,127,003 B2 | 10/2006 | Rajan |
| 7,130,944 B2 | 10/2006 | Perino |
| 7,142,612 B2 | 11/2006 | Horowitz |
| 7,142,865 B2 | 11/2006 | Tsai |
| 7,167,019 B2 | 1/2007 | Broyde |
| 7,180,949 B2 | 2/2007 | Kleveland |
| 7,184,483 B2 | 2/2007 | Rajan |
| 7,199,728 B2 | 4/2007 | Dally |
| 7,231,558 B2 | 6/2007 | Gentieu |
| 7,269,212 B1 | 9/2007 | Chau |
| 7,335,976 B2 | 2/2008 | Chen |
| 7,336,112 B1 | 2/2008 | Sha |
| 7,346,819 B2 | 3/2008 | Bansal |
| 7,349,484 B2 | 3/2008 | Stojanovic |
| 7,356,213 B1 | 4/2008 | Cunningham |
| 7,358,869 B1 | 4/2008 | Chiarulli |
| 7,362,130 B2 | 4/2008 | Broyde |
| 7,362,697 B2 | 4/2008 | Becker |
| 7,370,264 B2 | 5/2008 | Worley |
| 7,400,276 B1 | 7/2008 | Sotiriadis |
| 7,428,273 B2 | 9/2008 | Foster |
| 7,496,162 B2 | 2/2009 | Srebranig |
| 7,535,957 B2 | 5/2009 | Ozawa |
| 7,583,209 B1 | 9/2009 | Duan |
| 7,599,390 B2 | 10/2009 | Pamarti |
| 7,613,234 B2 | 11/2009 | Raghavan |
| 7,616,075 B2 | 11/2009 | Kushiyama |
| 7,620,116 B2 | 11/2009 | Bessios |
| 7,633,850 B2 | 12/2009 | Nagarajan |
| 7,639,596 B2 | 12/2009 | Cioffi |
| 7,643,588 B2 | 1/2010 | Visalli |
| 7,650,525 B1 | 1/2010 | Chang |
| 7,656,321 B2 | 2/2010 | Wang |
| 7,688,929 B2 | 3/2010 | Co |
| 7,694,204 B2 | 4/2010 | Schmidt |
| 7,698,088 B2 | 4/2010 | Sul |
| 7,706,456 B2 | 4/2010 | Laroia |
| 7,706,524 B2 | 4/2010 | Zerbe |
| 7,746,764 B2 | 6/2010 | Rawlins |
| 7,787,572 B2 | 8/2010 | Scharf |
| 7,808,883 B2 | 10/2010 | Green |
| 7,826,551 B2 | 11/2010 | Lee |
| 7,841,909 B2 | 11/2010 | Murray |
| 7,859,356 B2 | 12/2010 | Pandey |
| 7,860,190 B2 | 12/2010 | Feller |
| 7,868,790 B2 | 1/2011 | Bae |
| 7,869,546 B2 | 1/2011 | Tsai |
| 7,882,413 B2 | 2/2011 | Chen |
| 7,899,653 B2 | 3/2011 | Hollis |
| 7,907,676 B2 | 3/2011 | Stojanovic |
| 7,933,770 B2 | 4/2011 | Kruger |
| 8,036,300 B2 | 10/2011 | Evans |
| 8,050,332 B2 | 11/2011 | Chung |
| 8,055,095 B2 | 11/2011 | Palotai |
| 8,064,535 B2 | 11/2011 | Wiley |
| 8,085,172 B2 | 12/2011 | Li |
| 8,091,006 B2 | 1/2012 | Prasad |
| 8,149,906 B2 | 4/2012 | Saito |
| 8,159,375 B2 | 4/2012 | Abbasfar |
| 8,159,376 B2 | 4/2012 | Abbasfar |
| 8,185,807 B2 | 5/2012 | Oh |
| 8,199,849 B2 | 6/2012 | Oh |
| 8,199,863 B2 | 6/2012 | Chen |
| 8,218,670 B2 | 7/2012 | AbouRjeily |
| 8,233,544 B2 | 7/2012 | Bao |
| 8,245,094 B2 | 8/2012 | Jiang |
| 8,253,454 B2 | 8/2012 | Lin |
| 8,279,094 B2 | 10/2012 | Abbasfar |
| 8,279,745 B2 | 10/2012 | Dent |
| 8,279,976 B2 | 10/2012 | Lin |
| 8,284,848 B2 | 10/2012 | Nam |
| 8,289,914 B2 | 10/2012 | Li |
| 8,295,250 B2 | 10/2012 | Gorokhov |
| 8,341,492 B2 | 12/2012 | Shen |
| 8,365,035 B2 | 1/2013 | Hara |
| 8,429,492 B2 | 4/2013 | Yoon |
| 8,429,495 B2 | 4/2013 | Przybylski |

(56) References Cited

U.S. PATENT DOCUMENTS

| | | |
|---|---|---|
| 8,442,099 B1 | 5/2013 | Sederat |
| 8,442,210 B2 | 5/2013 | Zerbe |
| 8,451,913 B2 | 5/2013 | Oh |
| 8,462,891 B2 | 6/2013 | Kizer |
| 8,472,513 B2 | 6/2013 | Malipatil |
| 8,620,166 B2 | 6/2013 | Dong |
| 8,498,344 B2 | 7/2013 | Wilson |
| 8,498,368 B1 | 7/2013 | Husted |
| 8,520,493 B2 | 8/2013 | Goulahsen |
| 8,539,318 B2 | 9/2013 | Cronie |
| 8,577,284 B2 | 11/2013 | Seo |
| 8,578,246 B2 | 11/2013 | Mittelholzer |
| 8,588,254 B2 | 11/2013 | Diab |
| 8,588,280 B2 | 11/2013 | Oh |
| 8,593,305 B1 | 11/2013 | Tajalli |
| 8,638,241 B2 | 1/2014 | Sudhakaran |
| 8,649,445 B2 | 2/2014 | Cronie |
| 8,649,460 B2 | 2/2014 | Ware |
| 8,687,968 B2 | 4/2014 | Nosaka |
| 8,711,919 B2 | 4/2014 | Kumar |
| 8,718,184 B1 | 5/2014 | Cronie |
| 8,755,426 B1 | 6/2014 | Cronie |
| 8,773,964 B2 | 7/2014 | Hsueh |
| 8,780,687 B2 | 7/2014 | Clausen |
| 8,791,735 B1 | 7/2014 | Shibasaki |
| 8,831,440 B2 | 9/2014 | Yu |
| 8,879,660 B1 | 11/2014 | Peng |
| 8,938,171 B2 | 1/2015 | Tang |
| 8,949,693 B2 | 2/2015 | Ordentlich |
| 8,951,072 B2 | 2/2015 | Hashim |
| 8,989,317 B1 | 3/2015 | Holden |
| 8,996,740 B2 | 3/2015 | Wiley |
| 9,015,566 B2 | 4/2015 | Cronie |
| 9,020,049 B2 | 4/2015 | Schwager |
| 9,036,764 B1 | 5/2015 | Hossain |
| 9,059,816 B1 | 6/2015 | Simpson |
| 9,071,476 B2 | 6/2015 | Fox |
| 9,077,386 B1 | 7/2015 | Holden |
| 9,093,791 B2 | 7/2015 | Liang |
| 9,100,232 B1 * | 8/2015 | Hormati ............ H04L 25/03343 |
| 9,112,550 B1 * | 8/2015 | Ulrich ................... H04B 3/04 |
| 9,124,557 B2 | 9/2015 | Fox |
| 9,148,198 B1 | 9/2015 | Zhang |
| 9,152,495 B2 | 10/2015 | Losh |
| 9,165,615 B2 | 10/2015 | Amirkhany |
| 9,172,412 B2 | 10/2015 | Kim |
| 9,183,085 B1 | 11/2015 | Northcott |
| 9,197,470 B2 | 11/2015 | Okunev |
| 9,231,790 B2 | 1/2016 | Wiley |
| 9,246,713 B2 | 1/2016 | Shokrollahi |
| 9,288,082 B1 | 3/2016 | Ulrich |
| 9,288,089 B2 | 3/2016 | Cronie |
| 9,306,621 B2 | 4/2016 | Zhang |
| 9,362,974 B2 | 6/2016 | Fox |
| 9,363,114 B2 | 6/2016 | Shokrollahi |
| 9,374,250 B1 | 6/2016 | Musah |
| 9,401,828 B2 | 7/2016 | Cronie |
| 9,432,082 B2 | 8/2016 | Ulrich |
| 9,444,654 B2 | 9/2016 | Hormati |
| 9,455,744 B2 | 9/2016 | George |
| 9,455,765 B2 | 9/2016 | Schumacher |
| 9,461,862 B2 * | 10/2016 | Holden ............... H04L 27/2637 |
| 9,479,369 B1 | 10/2016 | Shokrollahi |
| 9,509,437 B2 | 11/2016 | Shokrollahi |
| 9,520,883 B2 | 12/2016 | Shibasaki |
| 9,537,644 B2 | 1/2017 | Jones |
| 9,565,036 B2 | 2/2017 | Zerbe |
| 9,634,797 B2 | 4/2017 | Benammar |
| 9,667,379 B2 * | 5/2017 | Cronie ................. H04L 1/0041 |
| 9,710,412 B2 | 7/2017 | Sengoku |
| 9,852,806 B2 | 12/2017 | Stauffer |
| 9,906,358 B1 | 2/2018 | Tajalli |
| 10,055,372 B2 * | 8/2018 | Shokrollahi ......... G06F 13/362 |
| 2001/0006538 A1 | 7/2001 | Simon |
| 2002/0034191 A1 | 3/2002 | Shattil |
| 2002/0044316 A1 | 4/2002 | Myers |
| 2002/0152340 A1 | 10/2002 | Dreps |
| 2002/0154633 A1 | 10/2002 | Shin |
| 2002/0163881 A1 | 11/2002 | Dhong |
| 2002/0174373 A1 | 11/2002 | Chang |
| 2002/0181607 A1 | 12/2002 | Izumi |
| 2003/0016770 A1 | 1/2003 | Trans |
| 2003/0117184 A1 | 6/2003 | Fecteau |
| 2003/0146783 A1 | 8/2003 | Bandy |
| 2003/0185310 A1 | 10/2003 | Ketchum |
| 2004/0057525 A1 | 3/2004 | Rajan |
| 2004/0092240 A1 | 5/2004 | Hayashi |
| 2004/0146117 A1 | 7/2004 | Subramaniam |
| 2004/0155802 A1 | 8/2004 | Lamy |
| 2004/0161019 A1 | 8/2004 | Raghavan |
| 2004/0170231 A1 | 9/2004 | Bessios |
| 2004/0239374 A1 | 12/2004 | Hori |
| 2005/0024117 A1 | 2/2005 | Kubo |
| 2005/0063493 A1 | 3/2005 | Foster |
| 2005/0128018 A1 | 6/2005 | Meltzer |
| 2005/0213686 A1 | 9/2005 | Love |
| 2005/0220182 A1 | 10/2005 | Kuwata |
| 2005/0275470 A1 | 12/2005 | Choi |
| 2006/0013331 A1 | 1/2006 | Choi |
| 2006/0120486 A1 | 6/2006 | Visalli |
| 2006/0126751 A1 | 6/2006 | Bessios |
| 2006/0133538 A1 | 6/2006 | Stojanovic |
| 2006/0140324 A1 | 6/2006 | Casper |
| 2006/0159005 A1 | 7/2006 | Rawlins |
| 2006/0232461 A1 | 10/2006 | Felder |
| 2006/0233291 A1 | 10/2006 | Garlepp |
| 2006/0291589 A1 | 12/2006 | Eliezer |
| 2007/0001713 A1 | 1/2007 | Lin |
| 2007/0001723 A1 | 1/2007 | Lin |
| 2007/0030796 A1 | 2/2007 | Green |
| 2007/0047689 A1 | 3/2007 | Menolfi et al. |
| 2007/0076871 A1 | 4/2007 | Renes |
| 2007/0164883 A1 | 7/2007 | Furtner |
| 2007/0201597 A1 | 8/2007 | He |
| 2007/0204205 A1 | 8/2007 | Niu |
| 2007/0283210 A1 | 12/2007 | Prasad |
| 2008/0007367 A1 | 1/2008 | Kim |
| 2008/0104374 A1 | 5/2008 | Mohamed |
| 2008/0159448 A1 | 7/2008 | Anim-Appiah |
| 2008/0192621 A1 | 8/2008 | Suehiro |
| 2008/0316070 A1 | 12/2008 | Van Acht |
| 2008/0317188 A1 | 12/2008 | Staszewski |
| 2009/0046009 A1 | 2/2009 | Fujii |
| 2009/0059782 A1 | 3/2009 | Cole |
| 2009/0154604 A1 | 6/2009 | Lee |
| 2009/0163162 A1 | 6/2009 | Hoffman |
| 2009/0167389 A1 | 7/2009 | Reis |
| 2009/0195281 A1 | 8/2009 | Tamura |
| 2009/0262876 A1 | 10/2009 | Arima |
| 2009/0316730 A1 | 12/2009 | Feng |
| 2010/0046644 A1 | 2/2010 | Mazet |
| 2010/0081451 A1 | 4/2010 | Mueck |
| 2010/0180143 A1 | 7/2010 | Ware |
| 2010/0215087 A1 | 8/2010 | Tsai |
| 2010/0215112 A1 | 8/2010 | Tsai |
| 2010/0215118 A1 | 8/2010 | Ware |
| 2010/0220828 A1 | 9/2010 | Fuller |
| 2010/0235673 A1 | 9/2010 | Abbasfar |
| 2010/0296556 A1 | 11/2010 | Rave |
| 2010/0309964 A1 | 12/2010 | Oh |
| 2011/0014865 A1 | 1/2011 | Seo |
| 2011/0051854 A1 | 3/2011 | Kizer |
| 2011/0072330 A1 | 3/2011 | Kolze |
| 2011/0084737 A1 | 4/2011 | Oh |
| 2011/0127990 A1 | 6/2011 | Wilson |
| 2011/0156757 A1 | 6/2011 | Hayashi |
| 2011/0228864 A1 | 9/2011 | Aryanfar |
| 2011/0235501 A1 | 9/2011 | Goulahsen |
| 2011/0268225 A1 * | 11/2011 | Cronie ................. H04L 25/0272 375/296 |
| 2011/0286497 A1 | 11/2011 | Nervig |
| 2011/0299555 A1 * | 12/2011 | Cronie ................. H04L 1/0041 370/476 |
| 2011/0302478 A1 | 12/2011 | Cronie |

(56) References Cited

U.S. PATENT DOCUMENTS

| | | |
|---|---|---|
| 2012/0161945 A1 | 6/2012 | Single |
| 2012/0213299 A1 | 8/2012 | Cronie |
| 2012/0257683 A1 | 10/2012 | Schwager |
| 2012/0327993 A1 | 12/2012 | Palmer |
| 2013/0010892 A1* | 1/2013 | Cronie ............... H04L 25/0276 375/296 |
| 2013/0013870 A1 | 1/2013 | Cronie |
| 2013/0088274 A1 | 4/2013 | Gu |
| 2013/0114392 A1 | 5/2013 | Sun et al. |
| 2013/0129019 A1 | 5/2013 | Sorrells |
| 2013/0159584 A1 | 6/2013 | Nygren |
| 2013/0259113 A1 | 10/2013 | Kumar |
| 2013/0271194 A1 | 10/2013 | Pellerano |
| 2013/0285720 A1 | 10/2013 | Jibry |
| 2013/0314142 A1 | 11/2013 | Tamura |
| 2013/0315501 A1 | 11/2013 | Atanassov |
| 2013/0346830 A1 | 12/2013 | Ordentlich |
| 2014/0177645 A1 | 6/2014 | Cronie |
| 2014/0254642 A1 | 9/2014 | Fox |
| 2014/0286381 A1 | 9/2014 | Shibasaki |
| 2015/0070201 A1 | 3/2015 | Dedic |
| 2015/0078479 A1 | 3/2015 | Whitby-Strevens |
| 2015/0078495 A1 | 3/2015 | Hossain |
| 2015/0117579 A1 | 4/2015 | Shibasaki |
| 2015/0180642 A1 | 6/2015 | Hsieh |
| 2015/0222458 A1* | 8/2015 | Hormati ............ H04L 25/03343 375/257 |
| 2015/0236885 A1 | 8/2015 | Ling |
| 2015/0249559 A1 | 9/2015 | Shokrollahi |
| 2015/0256326 A1 | 9/2015 | Simpson |
| 2015/0333940 A1 | 11/2015 | Shokrollahi |
| 2015/0349835 A1 | 12/2015 | Fox |
| 2015/0380087 A1 | 12/2015 | Mittelholzer |
| 2015/0381768 A1 | 12/2015 | Fox |
| 2016/0020796 A1 | 1/2016 | Hormati |
| 2016/0020824 A1 | 1/2016 | Ulrich |
| 2016/0036616 A1* | 2/2016 | Holden ............... H04L 27/2637 375/260 |
| 2016/0197747 A1 | 7/2016 | Ulrich |
| 2016/0218894 A1 | 7/2016 | Fox |
| 2016/0380787 A1 | 12/2016 | Hormati |
| 2017/0147520 A1* | 5/2017 | Shokrollahi .......... G06F 13/362 |
| 2017/0310456 A1 | 10/2017 | Tajalli |

FOREIGN PATENT DOCUMENTS

| | | |
|---|---|---|
| CN | 101820288 | 9/2010 |
| CN | 101854223 | 10/2010 |
| EP | 1926267 | 5/2008 |
| EP | 2039221 | 2/2013 |
| JP | 2003163612 | 6/2003 |
| WO | 2005002162 | 1/2005 |
| WO | 2009084121 | 7/2009 |
| WO | 2010031824 | 3/2010 |
| WO | 2011119359 | 9/2011 |

OTHER PUBLICATIONS

Zouhair Ben-Neticha et al, "The streTched-Golay and other codes for high-SNR fnite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Slepian, D., "Premutation Modulation", IEEE, vol. 52, No. 3, Mar. 1965, pp. 228-236.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.

Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.

Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.

Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.

Loh, M., et al., "A 3x9 Gb/s Shared, All-Digital CDR for High-Speed, High-Density I/O", Matthew Loh, IEEE Journal of Solid-State Circuits, Vo. 47, No. 3, Mar. 2012.

Healey, A., et al., "A Comparison of 25 Gbps NRZ & PAM-4 Modulation used in Legacy & Premium Backplane Channels", DesignCon 2012, 16 pages.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Design Brief 208 Using the Anadigm Multiplier CAM, Copyright 2002 Anadigm, 6 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Clayton, P., "Introduction to Electromagnetic Compatibility", Wiley-Interscience, 2006.

Burr, "Spherical Codes for M-ARY Code Shift Keying", University of York, Apr. 2, 1989, pp. 67-72, United Kingdom.

Counts, L., et al., "One-Chip Slide Rule Works with Logs, Antilogs for Real-Time Processing," Analog Devices Computational Products 6, Reprinted from Electronic Design, May 2, 1985, 7 pages.

Cheng, W., "Memory Bus Encoding for Low Power: A Tutorial", Quality Electronic Design, IEEE, International Symposium on Mar. 26-28, 2001, pp. 199-204, Piscataway, NJ.

Oh, et al., Pseudo-Differential Vector Signaling for Noise Reduction in Single-Ended Signaling, DesignCon 2009.

Abbasfar, A., "Generalized Differential Vector Signaling", IEEE International Conference on Communications, ICC '09, (Jun. 14, 2009), pp. 1-5.

Anonymous, "Constant-weight code", Wikipedia.org, retrieved on Jun. 2, 2017.

* cited by examiner

ORTHOGONAL DIFFERENTIAL VECTOR SIGNALING CODES WITH EMBEDDED CLOCK

CROSS REFERENCE TO RELATED APPLICATIONS

This application is a Continuation of U.S. application Ser. No. 14/952,491, filed Nov. 25, 2015, naming Amin Shokrollahi, entitled "Orthogonal Differential Vector Signaling Codes with Embedded Clock, which is hereby incorporated herein by reference in its entirety for all purposes.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling", hereinafter identified as [Cronie I];

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes", hereinafter identified as [Cronie II];

U.S. patent application Ser. No. 14/158,452, filed Jan. 17, 2014, naming John Fox, Brian Holden, Peter Hunt, John D Keay, Amin Shokrollahi, Richard Simpson, Anant Singh, Andrew Kevin John Stewart, and Giuseppe Surace, entitled "Chip-to-Chip Communication with Reduced SSO Noise", hereinafter identified as [Fox I];

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. patent application Ser. No. 14/816,896 filed Aug. 3, 2015, naming Brian Holden and Amin Shokrollahi, entitled "Orthogonal Differential Vector Signaling Codes with Embedded Clock", naming Brian Holden and Amin Shokrollahi, entitled "Orthogonal Differential Vector Signaling Codes with Embedded Clock", hereinafter identified as [Holden II];

U.S. Pat. No. 9,100,232 corresponding to U.S. patent application Ser. No. 14/612,241, filed Feb. 2, 2015 and issued Aug. 4, 2015, naming Ali Hormati, Amin Shokrollahi, and Roger Ulrich, entitled "Methods and Apparatus for Low Power Chip-to-Chip Communications with Constrained ISI Ratio", hereinafter identified as [Hormati I];

U.S. Provisional Patent Application No. 61/934,807, filed Feb. 2, 2014, naming Amin Shokrollahi, entitled "Vector Signaling Codes with High pin-efficiency and their Application to Chip-to-Chip Communications and Storage", hereinafter identified as [Shokrollahi I];

U.S. Provisional Patent Application No. 61/839,360, filed Jun. 23, 2013, naming Amin Shokrollahi, entitled "Vector Signaling Codes with Reduced Receiver Complexity", hereinafter identified as [Shokrollahi II];

U.S. Provisional Patent Application No. 61/946,574, filed Feb. 28, 2014, naming Amin Shokrollahi, Brian Holden, and Richard Simpson, entitled "Clock Embedded Vector Signaling Codes", hereinafter identified as [Shokrollahi III];

U.S. patent application Ser. No. 14/711,528, filed May 13, 2015, naming Amin Shokrollahi, entitled "Vector Signaling Codes with Improved Noise Margin", hereinafter identified as [Shokrollahi IV];

U.S. Provisional Patent Application No. 62/015,172, filed Jul. 10, 2014, naming Amin Shokrollahi and Roger Ulrich, entitled "Vector Signaling Codes with Increased Signal to Noise Characteristics", hereinafter identified as [Shokrollahi V];

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences", hereinafter identified as [Ulrich I];

U.S. patent application Ser. No. 14/315,306, filed Jun. 25, 2014, naming Roger Ulrich, entitled "Multilevel Driver for High Speed Chip-to-Chip Communications", hereinafter identified as [Ulrich II].

FIELD OF THE TECHNOLOGY

Described embodiments relate generally to the field of communications, and more particularly to the transmission and reception of signals capable of conveying information within and between integrated circuit devices.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES"). SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "length" of the vector. In some embodiments, the signal on one wire is entirely dependent on the signal on another wire, as is the case with DS pairs, so in some cases the length of the vector might refer to the number of degrees of freedom of signals on the plurality of wires instead of exactly the number of wires in the plurality of wires.

Any suitable subset of a vector signaling code denotes a "subcode" of that code. Such a subcode may itself be a vector signaling code. With binary vector signaling, each component or "symbol" of the vector takes on one of two possible values. With non-binary vector signaling, each symbol has a value that is a selection from a set of more than two possible values. When transmitted as physical signals on a communications medium, symbols may be represented by particular physical values appropriate to that medium; as examples, in one embodiment a voltage of 150 mV may represent a "+1" symbol and a voltage of 50 mV may represent a "−1" symbol, while in another embodiment "+1" may be represented by 800 mV and "−1" as −800 mV.

A vector signaling code, as described herein, is a collection C of vectors of the same length N, called codewords. The ratio between the binary logarithm of the size of C and the length N is called the pin-efficiency of the vector signaling code. The Orthogonal Differential Vector Signaling (ODVS) codes of [Cronie I], [Cronie II], [Fox I], [Shokrollahi I], [Shokrollahi II], and [Shokrollahi III] are examples of vector signaling codes, and are used herein for descriptive purposes.

FIG. 1 illustrates a prior art communication system employing vector signaling codes. Bits $S_0$, $S_1$, $S_2$ enter block-wise 100 into an encoder 112. The size of the block may vary and depends on the parameters of the vector signaling code. The encoder generates a codeword of the vector signaling code for which the system is designed. In operation, the encoder may generate information used to control PMOS and NMOS transistors within driver 118, generating voltages or currents on the N communication wires 125 comprising the communications channel 120. Receiver 132 reads the signals on the wires, possibly including amplification, frequency compensation, and common mode signal cancellation. Receiver 132 provides its results to decoder 138, which recreates the input bits at 140, here shown as received bits $R_0$, $R_1$, $R_2$.

Depending on which vector signaling code is used, there may be no decoder, or no encoder, or neither a decoder nor an encoder. For example, for the 8b8w code disclosed in [Cronie II], both encoder 112 and decoder 138 exist. On the other hand, for the Hadamard code disclosed in [Cronie I], an explicit decoder may be unnecessary, as the system may be configured such that receiver 132 generates output bits 140 directly.

The operation of the transmitting device 110, comprising input data 100 and elements 112 and 118, and that of the receiving device 130, consisting of element 132, optional element 138, and output data 140, have to be completely synchronized in order to guarantee correct functioning of the communication system, accurately capturing received signals from each wire 125 and presenting the received results as complete codewords to decoder 138 for analysis. In some embodiments, this synchronization is performed by an external clock shared between the transmitter and the receiver. Other embodiments may combine the clock function with one or more of the data channels, as in the well-known Biphase encoding used for serial communications.

One important example is provided by memory interfaces in which a clock is generated on the controller and shared with the memory device. The memory device may use the clock information for its internal memory operations, as well as for I/O. Because of the burstiness and the asynchronicity of memory operations, the I/O may not be active all the time. Moreover, the main clock and the data lines may not be aligned due to skew. In such cases, additional strobe signals are used to indicate when to read and write the data.

BRIEF DESCRIPTION

Orthogonal differential vector signaling codes providing transport for both data and a clocking signal are described which are suitable for implementation in both conventional high-speed CMOS and DRAM integrated circuit processes. Example channels derived from current practice for Low-Powered DDR4 interfaces are described, as are modest channel enhancements providing higher speed and greater signal integrity.

DETAILED DESCRIPTION

Figure 1:
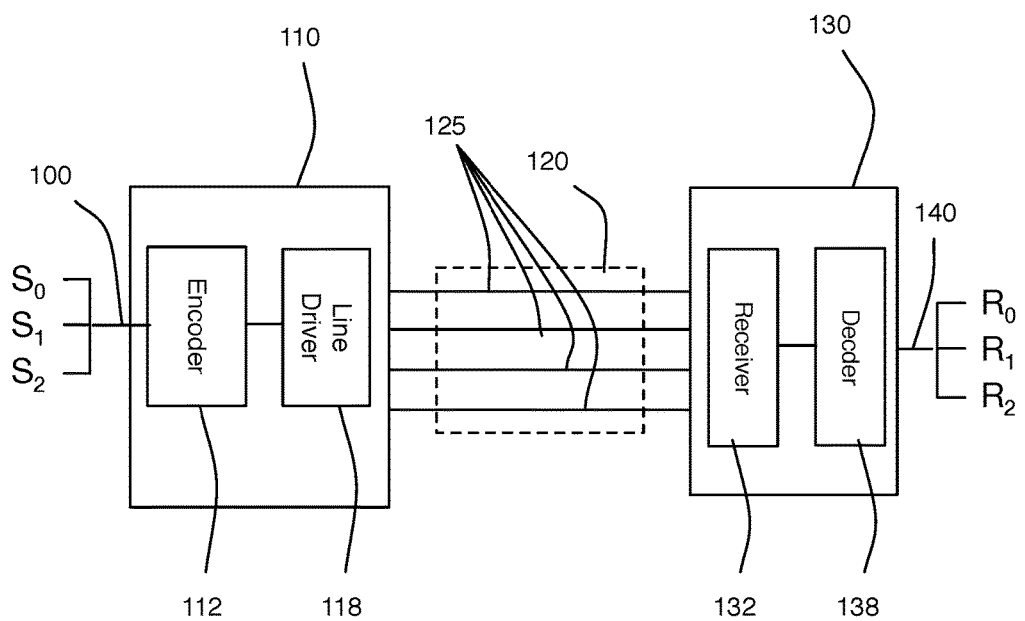
FIG. 1 illustrates a prior art communication system employing vector signaling codes.
Figure 2:
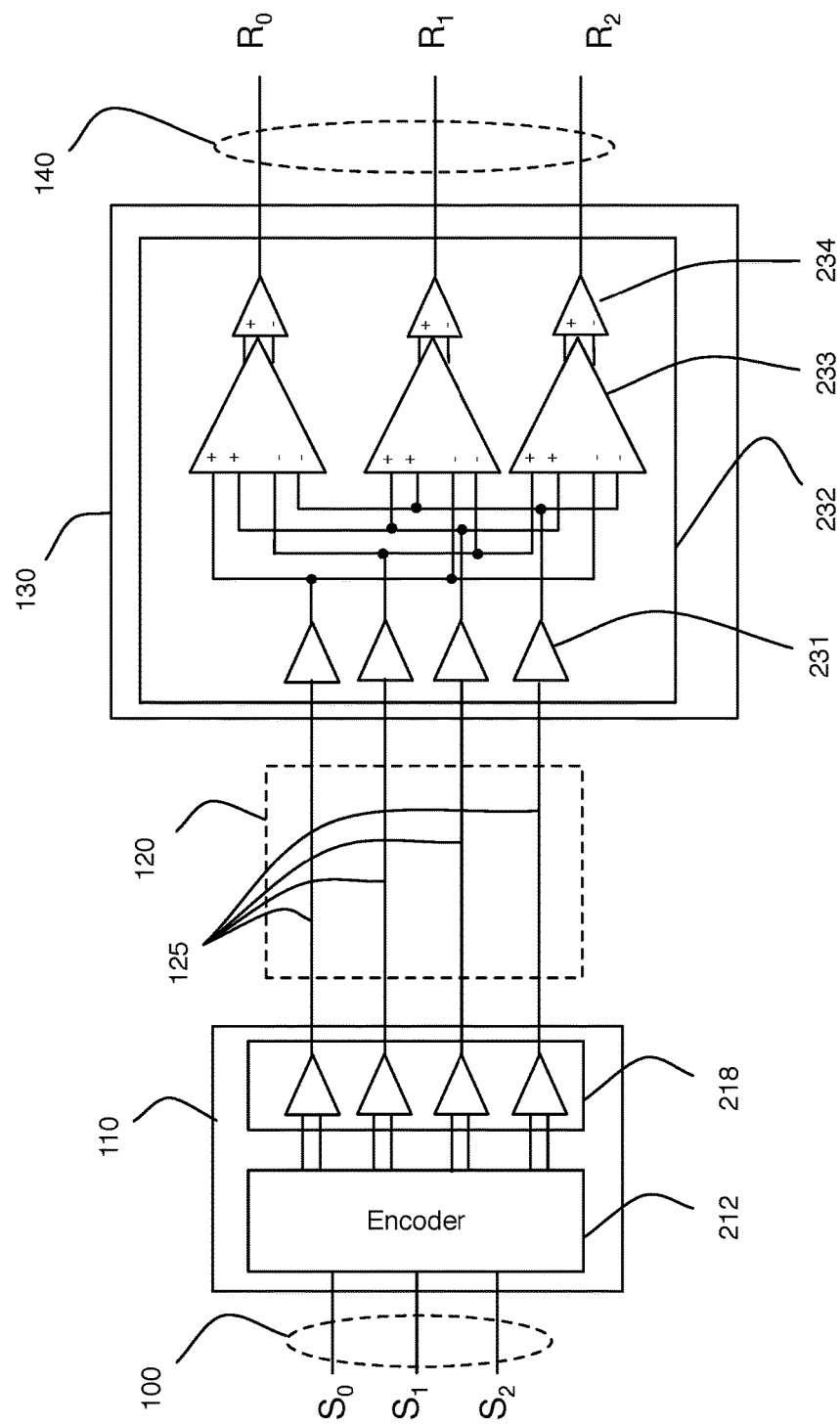
FIG. 2 illustrates one embodiment of an ODVS communications system in which a discrete decoding function is not required.

FIG. 2 is a block diagram of a communications system using a vector signaling code to transport three data bits 100 over a communications channel 120 comprised of four wires 125. For descriptive convenience and without implying limitation, a vector signaling code derived from the order-4 Hadamard matrix commonly called "H4" and "ENRZ" is used in this and subsequent examples.

ENRZ may be detected efficiently using multi-input comparators, as described in [Holden I] and subsequently described herein in greater detail. Receiver 130 incorporates three instances of multi-input comparators 233 to obtain three results derived from combinatorial manipulation of sets of received wire signals, the results of which are then measured by digital comparators 234 to obtain three received data bits 140. The receiver may optionally include amplification and/or frequency compensation (Continuous Time Linear Equalization or CTLE, as one example) 231 to compensate for attenuation or frequency-dependent loss in communications channel 120.

System Environment

One important application for a high speed chip-to-chip communications interface is to provide connection between a memory controller and one or more memory storage devices. In such applications, a clock is generated on the controller and shared with the memory device or devices. The memory device may use the clock information for its internal memory operations, as well as for I/O. Because of the burstiness and the asynchronicity of memory operations, the I/O may not be active all the time. Moreover, the main clock and the data lines may not be aligned due to skew. In such cases, additional strobe signals are used to indicate when to read and write the data.

The interface between a system memory controller and multiple Dynamic RAM devices has been well optimized over multiple design generations for both transfer speed and low power consumption. As one example, the present state of the art DRAM interface, LPDDR4, is comprised of 8 data lines, 1 DMI signal, 2 strobe lines, as well as other non-data-transfer related lines.

There is considerable interest in extending LPDDR4 to support higher performance at equal or less power consumption, but simple performance extrapolations of the existing technology seem problematic. Decreasing signal integrity precludes simply raising data transfer rates using the existing single-ended interconnection, and misalignment of received DRAM data and its strobe signal is a known issue even at current clock speeds. However, introduction of new technology is constrained by a strong desire to retain as much of the conventional practice as possible regarding bus layout, signal distribution, clocking, etc., as well as a hard requirement that the new technology be implementable in both the high-speed CMOS process used for memory controllers, and in the highly specialized DRAM fabrication process which produces extremely small, high capacitance and low leakage memory cells, but comparatively slow digital and interface logic.

Because of this slow logic speed, conventional DRAM designs utilize two or more phases of processing logic to handle the current LPDDR4 data transfer rates, as one example using one phase of processing logic to capture data on the rising edge of the data transfer strobe, and another phase of processing logic to capture data on the falling edge of the strobe. One hidden limitation of such multi-phased processing embodiments is the difficulty of extracting difference-based information from consecutively received unit intervals, as consecutive unit intervals by definition are known only by different processing phases. Thus, multi-phased processing is problematic for codes using transition-encoding, as well as for embedded- or self-clocking data solutions that rely on comparison of data values received in consecutive unit intervals.

These issues of clock extraction, and transition- or change-detection are most intractable in the communications receiver embodiment, thus the examples herein focus on embodiments in which a relatively slow DRAM device is the receiver and the more complex clock timing operations are performed by the transmitting controller device. No limitation is implied, as one familiar with the art will readily acknowledge that bidirectional data communication, including with DRAM devices, is well understood. It is equally obvious that the described embodiments may also be implemented using less constrained integrated circuit processes, including conventional high speed integrated circuit processes and nonvolatile memory processes. DRAM embodiments may choose to utilize known art transmit clocking, essentially "turning around" the received clock and using it as an in-phase transmit clock with the controller's receiver performing the necessary clock phase adjustment. Alternatively, DRAM embodiments may incorporate local clock generation and/or clock phase adjustment as taught herein, or in combination with known art methods.

Receivers Using Multi-Input Comparators

As described in [Holden I], a multi-input comparator with coefficients $a_0, a_1, \ldots, a_{m-1}$ is a circuit that accepts as its input a vector $(x_0, x_1, \ldots, x_{m-1})$ and outputs $$\text{Result} = (a_0 * x_0 + \ldots + a_{m-1} * x_{m-1}) \qquad \text{(Eqn. 1)}$$

In many embodiments, the desired output is a binary value, thus the value Result may be sliced with an analog comparator to produce a binary decision output. Because this is a common use, the colloquial name of this circuit incorporates the term "comparator", although other embodiments may use a PAM-3 or PAM-4 slicer to obtain ternary or quaternary outputs, or indeed may retain the analog output of Eqn. 1 for further computation.

[Holden I] and [Ulrich I] teach that the ENRZ may be detected using three instances of a four input multi-input comparator, performing the operations $$R_0 = (A+C) - (B+D) \qquad \text{(Eqn. 2)}$$

$$R_1 = (C+D) - (A+B) \qquad \text{(Eqn. 3)}$$

$$R_2 = (C+B) - (D+A) \qquad \text{(Eqn. 4)}$$

or their algebraic equivalents, optionally including a normalization or scaling factor on the results. These operations may be readily performed with three identical instances of a multi-input comparator with coefficients of [+1+1−1 −1] and distinct permutations of the four input values as described in Eqn. 2-4.

In general, embodiments of such multi-input comparator receivers operate asynchronously up to the actual capture of results. The boundary between asynchronous and clocked processing domains then varies, with some embodiments subsequently produce digital outputs using level-detecting comparators and thus deferring entry to a clocked processing domain, as illustrated in FIG. 2. Other embodiments utilize clocked samplers to constrain the measurement operation on the MIC outputs in both amplitude and time dimensions, creating at the sampling point a transition to clocked operation. To avoid confusion, the term "comparator" will be used herein to describe a measurement constrained only in amplitude, while "sampler" will describe a measurement also constrained in time as with a sampling clock.

ODVS Sub-Channels

Figure 4:
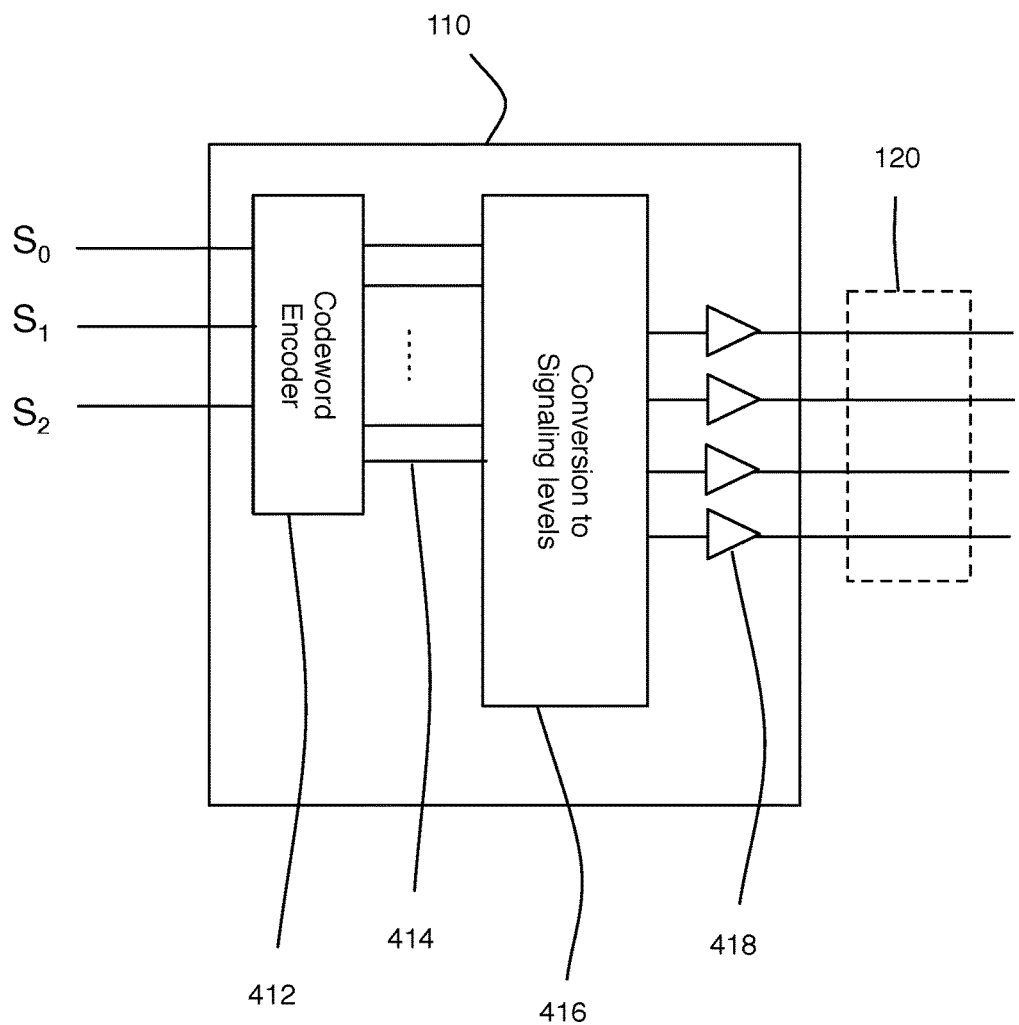
FIG. 4 is a block diagram of one embodiment of an ENRZ transmitter encoding the set of data inputs as a codeword, the elements of which are represented as signaling levels and then transmitted.
Figure 5:
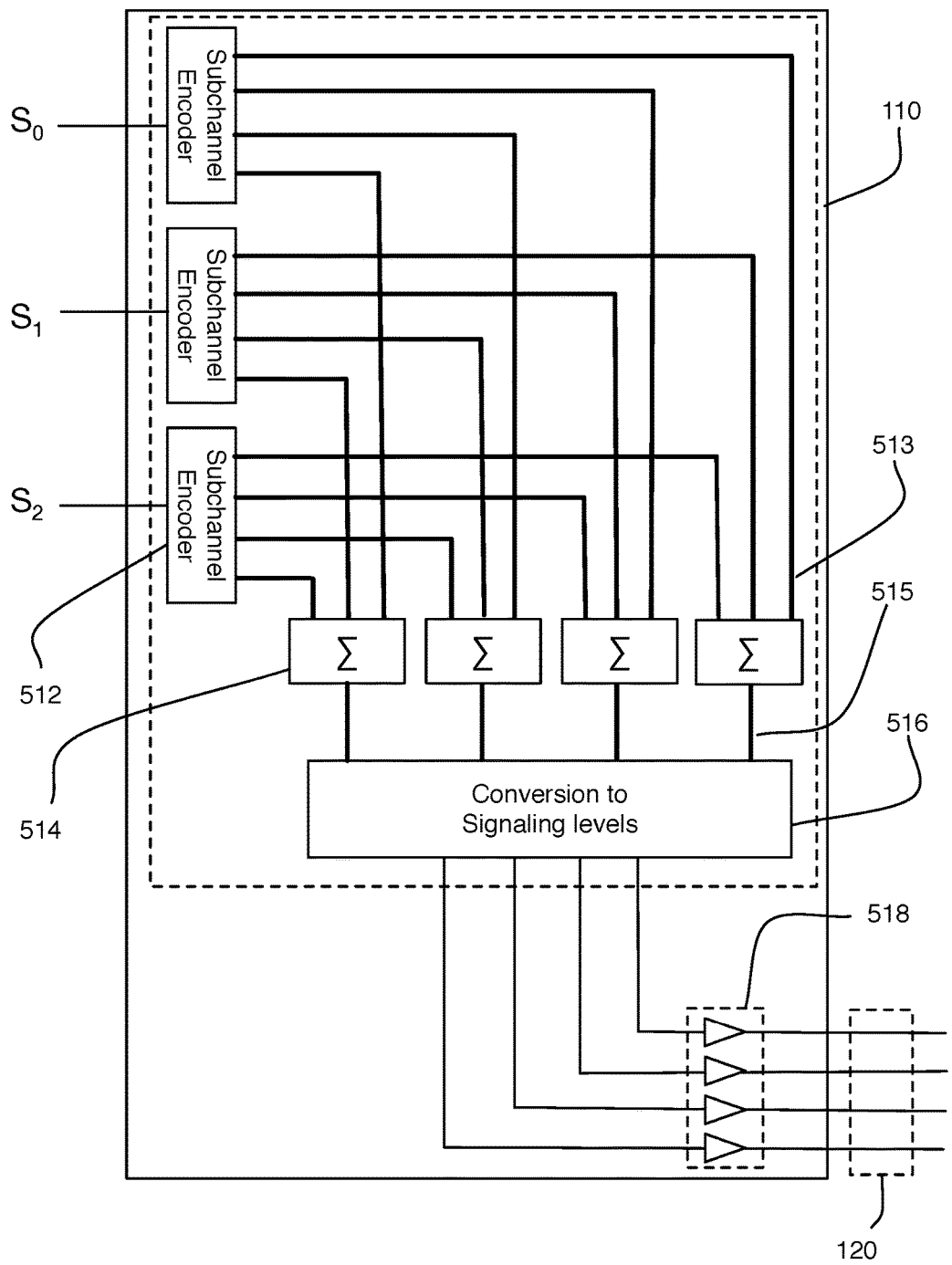
FIG. 5 is a block diagram of a second embodiment of an ENRZ transmitter encoding individual data inputs on three subchannels that are then summed, represented as signaling levels, and transmitted.
Figure 6:
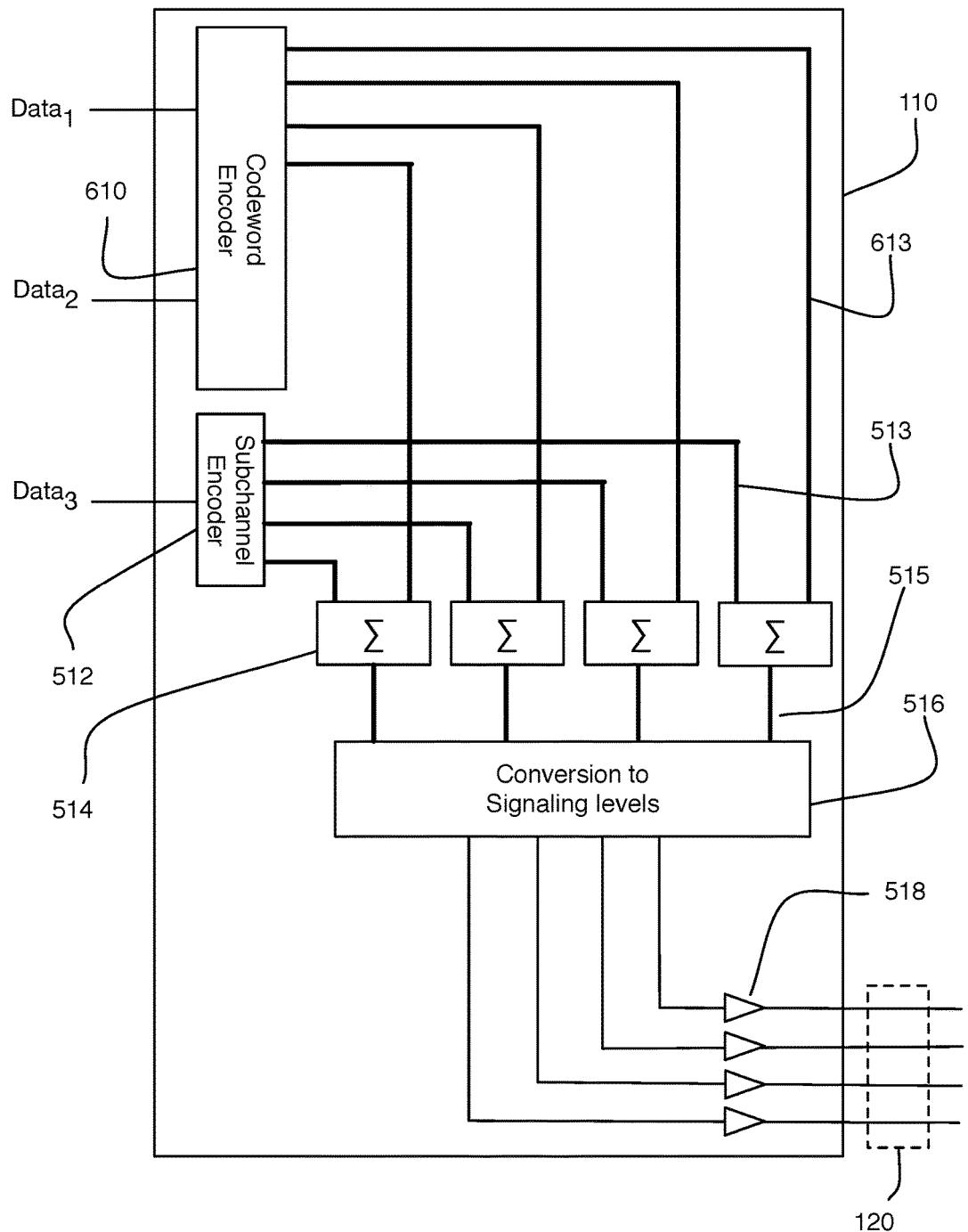
FIG. 6 is a block diagram of a third embodiment of an ENRZ transmitter encoding two data inputs as codewords representing a summation of two subchannels, encoding a third data input on a third subchannel, all subchannels then being summed, represented as signaling levels, and transmitted.

The block diagram of FIG. 2 provides a system-level overview for the subsequent examples illustrated as FIGS. 4-6. As with the previous MIC example, ENRZ is used herein for descriptive convenience, with no limitation implied. As the primary differences among these examples are in internal operational details of the transmitter with all examples producing equivalent transmit data streams, a receiver as illustrated in FIG. 2 may be assumed.

It is conventional to consider the data input to an ODVS encoder as vectors of data (i.e., a data word) to be atomically encoded as a codeword to be transmitted across a communications channel, detected by a receiver, and ultimately decoded to produce a received reconstruction of the transmitted vector or data word. An embodiment of a transmitter compatible with this model is shown in FIG. 4, wherein a data word $S_0, S_1, S_2$ is accepted by codeword encoder 412, producing a codeword 414. As the symbols comprising the data-modulated ENRZ codeword are to be communicated over discrete wires of communications channel 120, each such symbol is converted into suitable signaling levels 416 and emitted via line drivers 418 to the communications channel 120. ENRZ utilizes a four letter alphabet, generally represented by the values $\{+1, +\frac{1}{3}, -\frac{1}{3}, -1\}$. Thus, one practical embodiment of an ENRZ transmitter as shown in FIG. 4 uses two binary signal wires per symbol or a total of eight wires to connect the ENRZ encoder to the signaling level converter/output buffer driving four output wires; other embodiments may use different internal coding including without limitation analog signal levels, different numbers of binary signals, etc.

The ENRZ code contains eight unique codewords, consisting of the permutations of $\{+1, -\frac{1}{3}, -\frac{1}{3}, -\frac{1}{3}\}$ and $\{-1, \frac{1}{3}, \frac{1}{3}, \frac{1}{3}\}$, which are sufficient to uniquely encode three binary bits. One embodiment of encoder 412 uses a simple look-up table to map input word $S_0$, $S_1$, $S_2$ to a data-modulated codeword. Equivalent embodiments utilize Boolean logic to perform the same operation at higher speed than possible using a memory-based look-up.

It is possible to design codeword encoders that operate asynchronously, using only unclocked Boolean logic devices. Other designs may rely on clocked pipelining or parallel phases of processing. What all codeword encoders have in common, however, is that their look-up or Boolean logic computation relies on multiple input values being simultaneously present in producing an output codeword. That is, an output codeword is a monolithic data object, dependent on more than one input value. Thus, it follows that if the output of a codeword encoder must resolve to a stable value quickly, its input values should only transition concurrently, thus implying they are within the same clock domain (as that term is conventionally understood in the art). It further follows that when operating at speeds limited primarily by the encoding operation's latency (a common situation in practice) a prudent system embodiment will present the encoder with inputs at one clock tick and accept the resultant codeword at a subsequent clock tick (i.e. synchronously).

It is equally accurate to model an ODVS communications system in a different way. As originally described in [Cronie I], an ODVS code may be fully specified by a Matrix having certain well-defined qualities; in particular, such a Matrix has an initial row consisting of all 1 values, with each subsequent row consisting of values summing to zero and being orthogonal to all other rows. Columns of the matrix correspond to signals on particular communication channel wires, while rows of the matrix correspond to mutually orthogonal subchannels capable of carrying information. In practical embodiments the first row, corresponding to communication over the common mode of the wires, is not used for transmission.

FIG. 5 is a block diagram of an embodiment based on this model. Modulation of a given subchannel corresponds to multiplication of its matrix row values by the modulating information signal, as performed by Subchannel encoders 512. Depending on the particular embodiment and the characteristics of the Matrix describing the subchannels, some or all of Subchannel encoders 512 may represent trivial functions such as assignment of an input value scaled by certain weighting values to certain outputs, or may represent operations performed by Boolean logic, or by digital look-up tables (LUT.) All modulated subchannel result vectors as in 513 are summed in an asynchronous codeword generator 514. By convention, the vector of elements comprising this summation result, also known as an asynchronous-transmit codeword, is described as being normalized to the range [−1, +1] for mathematical consistency, although in some physical embodiments this normalization is subsumed into other operations rather than being performed independently. The resulting vector of elements is converted into physical signaling levels 516 and output 518 as analog physical signals onto the communications channel wires 120.

Equivalent and compliant embodiments may utilize circuits or subsystem that combine one or more of the described steps. As one example, at least one embodiment integrates conversion 516 and output buffering 518 operations in a combined subsystem.

Figure 11:
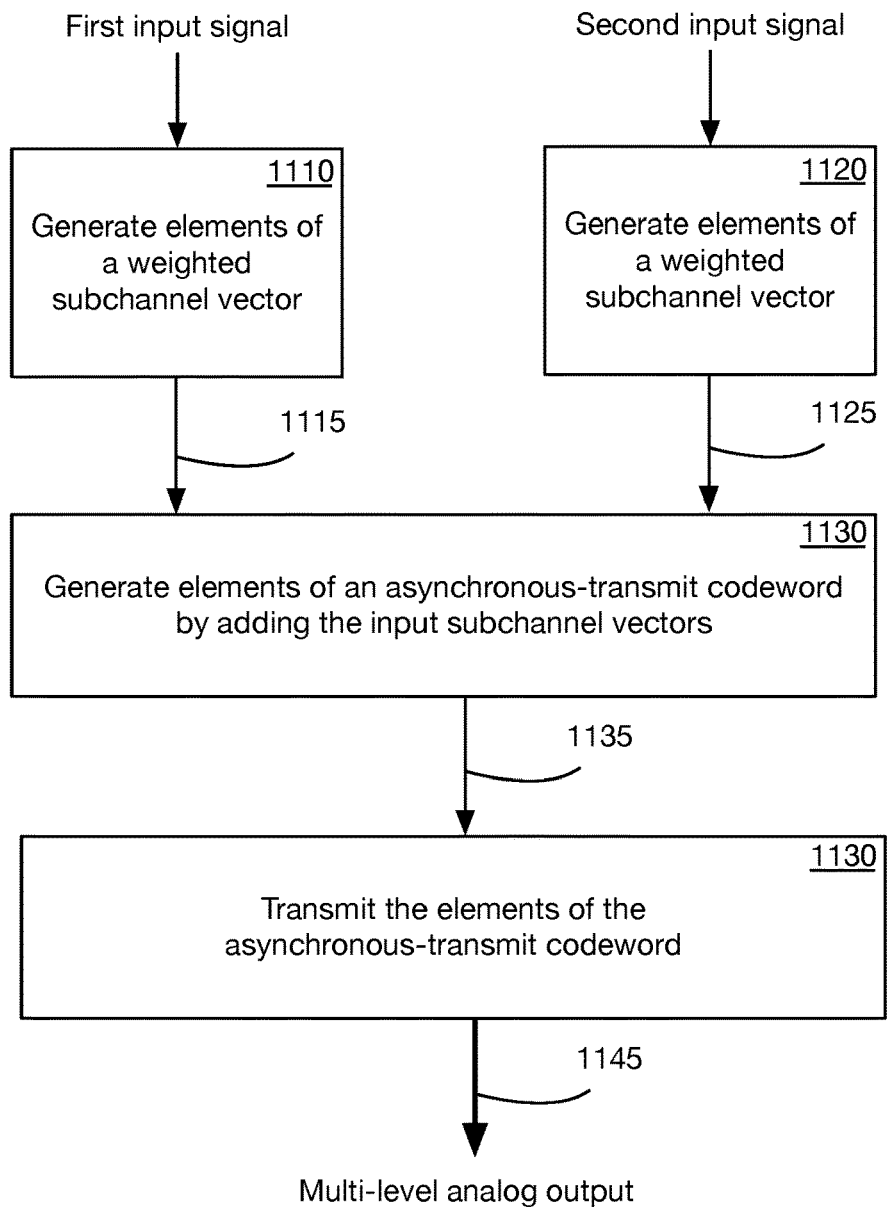
FIG. 11 is a flow chart illustrating the method of producing physical output signals encoding a first and a second input signal.

Such subchannel encoding is further illustrated in the flow chart of FIG. 11. A first input signal is received by a first subchannel encoder 1110, which responsively generates elements of a first weighted subchannel vector 1115. A second input signal is received by a second subchannel encoder 1120, which responsively generates elements of a second weighted subchannel vector 1125. Asynchronous codeword generator 1130 adds the first and second weighted subchannel vectors 1115 and 1125 to produce asynchronous-transmit codeword output 1135, wherein elements of 1135 transition asynchronously in response to transitions of 1115 and/or 1125. The elements of asynchronous-transmit codeword 1135 are transmitted 1130 as multi-level analog signals 1145 on a multi-wire bus or communications channel.

As previously described, in various embodiments the subchannel vectors may be generated by analog computation, by digital encoding as sets of one or more bits representing elements of the subchannel vectors, such digital encoding being performed by Boolean digital logic, look-up tables, or other embedded digital computational elements. The summation of the subchannel vectors to generate an asynchronous-transmit codeword may similarly be performed by analog computation, by digital computation using digital adders, Boolean logic circuits, look-up tables, or other embedded digital computational element.

In some embodiments, changes or transitions of value of the first input signal and the second input signal may occur asynchronously, synchronously with identical or nonidentical phase, or plesiochronously with varying or nonidentical phase. In at least one such embodiment, the first input signal is a data signal and the second input signal is a clock signal. In some embodiments, transitions on the second input signal occur one half transmit unit interval delay relative to transitions on the first input signal. In other embodiments, the first input signal transitions at a first rate, and the second input signal transitions at a second rate that is an integer fraction of the first rate.

Equivalence of the Codebook and Subchannel Models

As described in [Cronie I], the H4 or ENRZ code is defined by Hadamard matrix of order 4. Thus, three rows of the matrix represent usable communication subchannels, and the four columns represent signals to be carried over the four wires of the communication channel. Enumerating all possible combinations of binary values modulating each of the subchannels gives $2^3$ distinct summed subchannel results, equivalent to the eight "codewords" of the previous model.

One familiar with the art may observe that the vectors of input weights for multi-input comparators which a compatible receive embodiment may use to detect the ENRZ code is similarly described by rows of the matrix; as with the transmitter, practical embodiments do not implement a MIC corresponding to the first row of the matrix representing common mode transmission. As all other rows of the matrix are orthogonal to that first row, all MICs corresponding to those other rows will thus have inherent common mode immunity.

Communication over ODVS channels need not be limited to binary modulation. [Shokrollahi IV] teaches that PAM-3 and higher-ordered codes may be used over ODVS subchannels, and [Shokrollahi V] teaches that the modulation amplitude of a given ODVS subchannel may be adjusted, so as to provide comparable adjustment of the corresponding MIC output level at a receiver, thus demonstrating that a subchannel acts as a linear communications medium. However, as both [Shokrollahi IV] and [Shokrollahi V] presume conventional codeword-based communication models, they caution that such modulations can significantly impact the alphabet size required to describe the resulting codewords (and thus also the number of discrete signal levels appearing on communication channel wires,) and describe methods for constraining such alphabet growth.

Interpreting the system embodiment illustrated in FIG. 2 using this subchannel model, input data vector 100 entering communications transmitter 110 is shown as being comprised of individual bits $S_0$, $S_1$, $S_2$ entering encoder 112. Each of the individual bits $S_0$, $S_1$, $S_2$ modulate a separate subchannel, corresponding to multiplication of the input value by its corresponding orthogonal vector of the matrix defining that ODVS code. The resulting signals emitted onto the wires are thus the superposition (i.e. the summed values) of the resulting modulated subchannels.

The internal structure of receiver 132 is comprised of four receive front ends (as 131) that accept signals from wires 125, and optionally may include amplification and equalization as required by the characteristics of the communications channel 120. Three multi-input comparators are shown with their inputs connected to the four received wire signals as described by Eqns. 2, 3, and 4. For avoidance of confusion, the multi-input comparators are illustrated as being comprised of a computational function 233 performing the operations of Eqn. 2, Eqn. 3, and Eqn. 4 resulting in analog outputs representing the corresponding modulated subchannel signals, followed by a slicing function 234 producing digital outputs $R_0$, $R_1$, $R_2$ corresponding to the binary modulation values $S_0$, $S_1$, $S_2$ accepted by the transmitter. No limitation to this configuration is implied, however, as in practice these functions may also be combined together or with other circuit elements to provide equivalent functionality.

Independence of Subchannel Timing

One familiar with the art may note that the ODVS encoder described in this manner is not constrained to produce a particular combination of wire outputs (e.g. in the previous encoding model, a single codeword) for each transmit unit interval. The familiar communications concept of "unit interval" may continue to have validity with respect to maximum signaling rate over any given subchannel, but not necessarily with respect to timing limitations between modulation on two different subchannels. In particular, this implies that the input data in this subchannel model need not be constrained to a single clock domain.

As an example, consider an instance of this embodiment not utilizing any timing-based component such as clocked latch or clocked multiplexor in its subchannel encoders nor in its MIC-based receivers. One may then observe, as one specific example offered without limitation, the input data bit $S_2$ may change state one half unit interval later than the input data bits $S_0$ and $S_1$ entering the transmit encoder and, as long as such state changes do not occur on a given subchannel more frequently than once per unit interval, the aggregate signaling capacity of the communications channel will not be exceeded and the receiver may detect all three results without error, reproducing at its output the same timing relationship as the input values had when presented to the encoder. Interpreting this result in the context of conventional codeword encoding, an asynchronous codeword encoder produces modulated codeword outputs based on the state of its inputs. Thus, input data bits $S_0$ and $S_1$ and a first state of input bit $S_2$ will result in a first modulated codeword output, and when input bit $S_2$ asynchronously transitions to a second state, a new modulated codeword will be output derived from the new combination of inputs $S_0$, $S_1$, and $S_2$.

One of exceptional knowledge in the art may note that the timing relationship at the receiver may not be exactly duplicate that of the transmitter, as the three subchannels may represent distinct propagation modes of the communications medium having slightly different propagation velocities. Similarly, physical variations among elements of the transmitter and receiver may introduce timing skews between the subchannel signals impacting the timing relationship. However, in a given practical embodiment it is reasonable to assume that such variations are both small and consistent, thus capable of being addressed using well known practices of the art.

Continuing the example, the same embodiment may use, for example, the $S_2$ subchannel to communicate a reference clock signal from transmitter to receiver, the receiver using transition edges of $S_2$ to latch received data values $S_0$ and $S_1$ at the optimum (i.e. center of "eye") time. This desired clock-to-data phase relationship is produced and controlled at the transmitter, with no elaborate PLL, DLL, or adjustable timing delay function being required at the receiver. The required timing relationship at the transmitter may be determined by design, calculation or estimation; in a further embodiment, the actual timing relationship and/or other receiver characteristic such as error rate may be measured at the receiver, communicated via a return channel to the transmitter, and used to adjust or correct the clock phase relative to data transitions.

Figure 3:
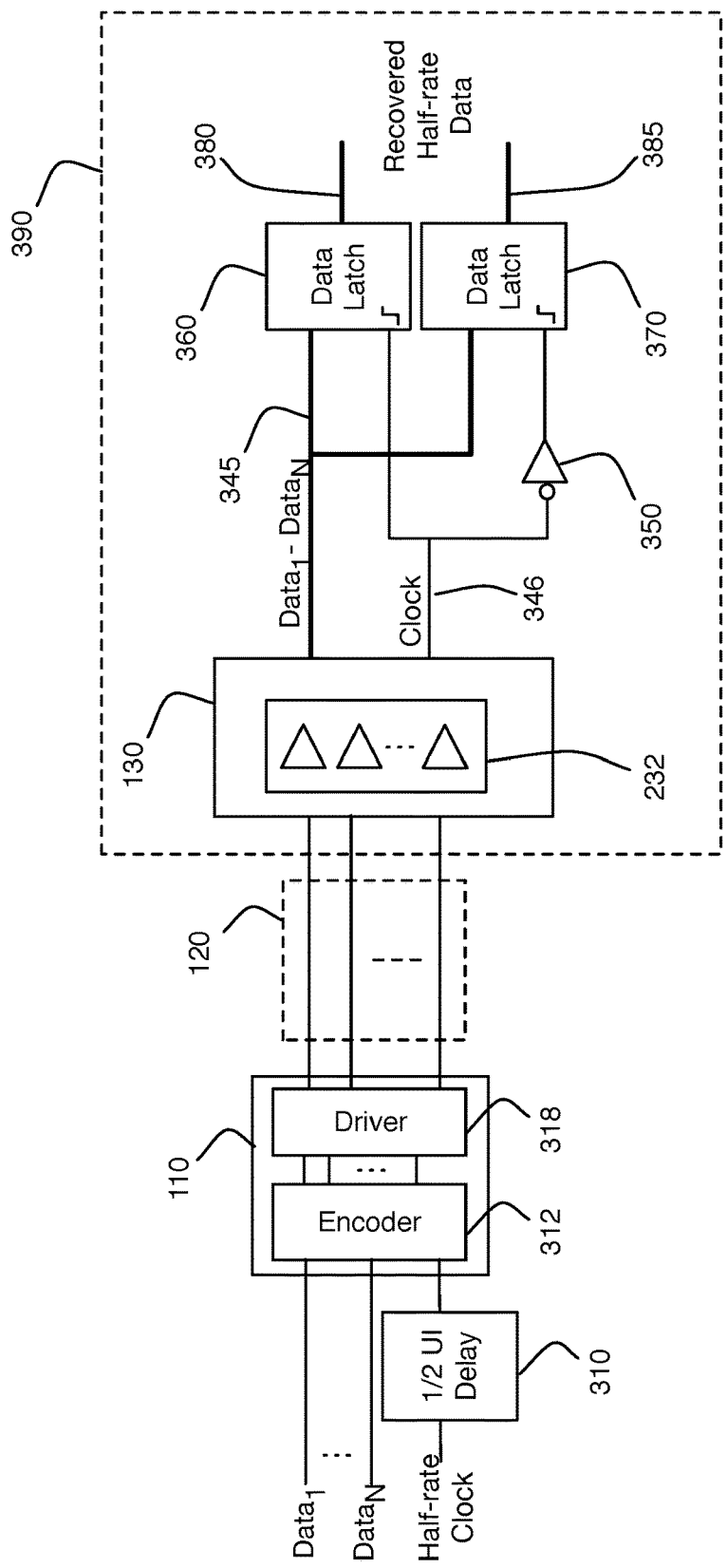
FIG. 3 is a block diagram of an embodiment transporting data and a clock signal using an ODVS code wherein the signal transitions of the clock being transported are offset from signal transitions of the data being transported.

FIG. 3 is a block diagram of a system embodiment incorporating such a transition-offset reference clock. The transmitter accepts two binary data inputs and a square wave clock signal making exactly one transition per unit interval (herein subsequently described as a half-rate clock.) In one embodiment used for purposes of illustration, the half-rate clock transitions simultaneously with transitions of the binary data inputs, and a ½ UI delay 310 is then introduced prior to encoder 312, which encodes the two data values and the phase-offset clock on a first, second, and third subchannels, respectively.

Figure 10A:
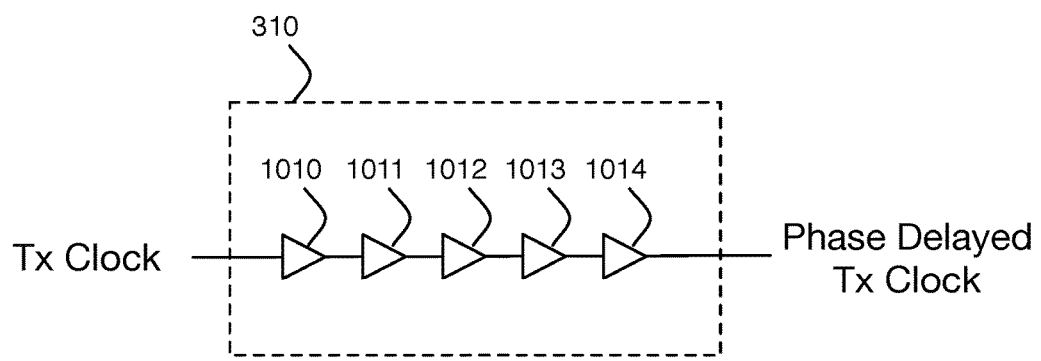
FIGS. 10A and 10B show embodiments of clock phase adjustment.
Figure 10B:
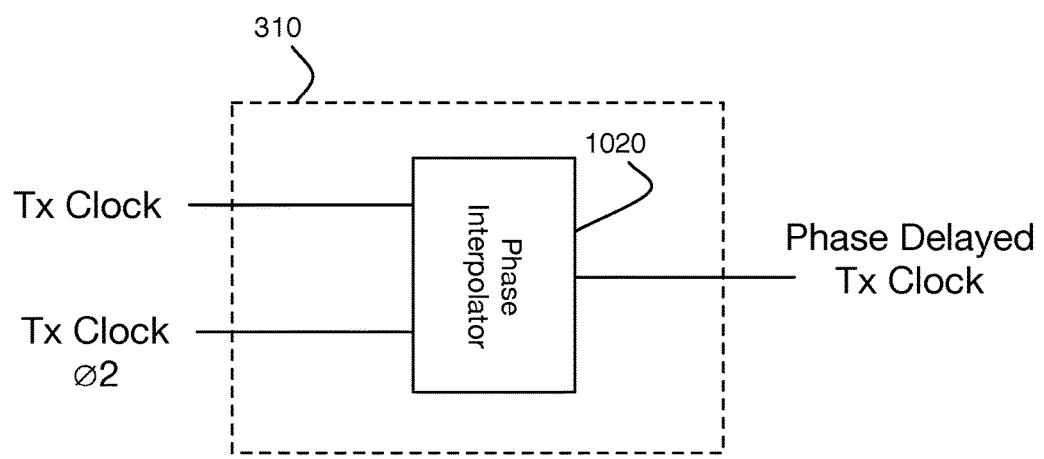

FIGS. 10A and 10B show example embodiments of delay 310 utilizing, respectively, a delay line utilizing logic delay elements and a phase interpolator.

In FIG. 10A, multiple delay buffer elements 1010, 1011, 1012, 1013, and 1014 introduce propagation delay into input signal Tx Clock, resulting in output Phase Delayed Tx Clock. The individual and/or aggregate delays of the delay buffer elements may in some embodiments be adjusted by modulation of an implementation parameter such as supply current, node capacitance, path resistance, or other element or behavior known in the art. Such adjustment may be performed one time, as at initialization, or during operation as part of a management or closed loop control behavior as known in the art. acting upon multiple phases from a clock generator.

The embodiment of FIG. 10B utilizes (in this example) two distinct phases of input signal input to Phase Interpolator circuit 1020, which outputs Phase Delayed Tx Clock having a intermediary phase. As is well known in the art, more than two distinct phases of input signal may be utilized, with the Phase Interpolator selecting among said inputs as well as interpolating between them.

In an equivalent embodiment, the clock generator producing the data clock and the half-rate clock may be designed to introduce a fixed 90 degree phase offset into the half-rate clock output, as will be well understood to a practitioner of the art.

Receiver 130 detects the subchannels, producing received data 345 corresponding to received information on the first and second subchannels, and received clock 346 corresponding to received information on the third subchannel. Positive transitions of clock 346 trigger data latch 360 and, due to the action of inverter 350, negative transitions of clock 346 trigger data latch 370, producing latched data outputs 380 and 385. Because of the ½ UI phase offset introduced at the transmitter, the receiver may latch data with optimum "center of receive eye" timing, without need of receive-side delay components.

Figure 9:
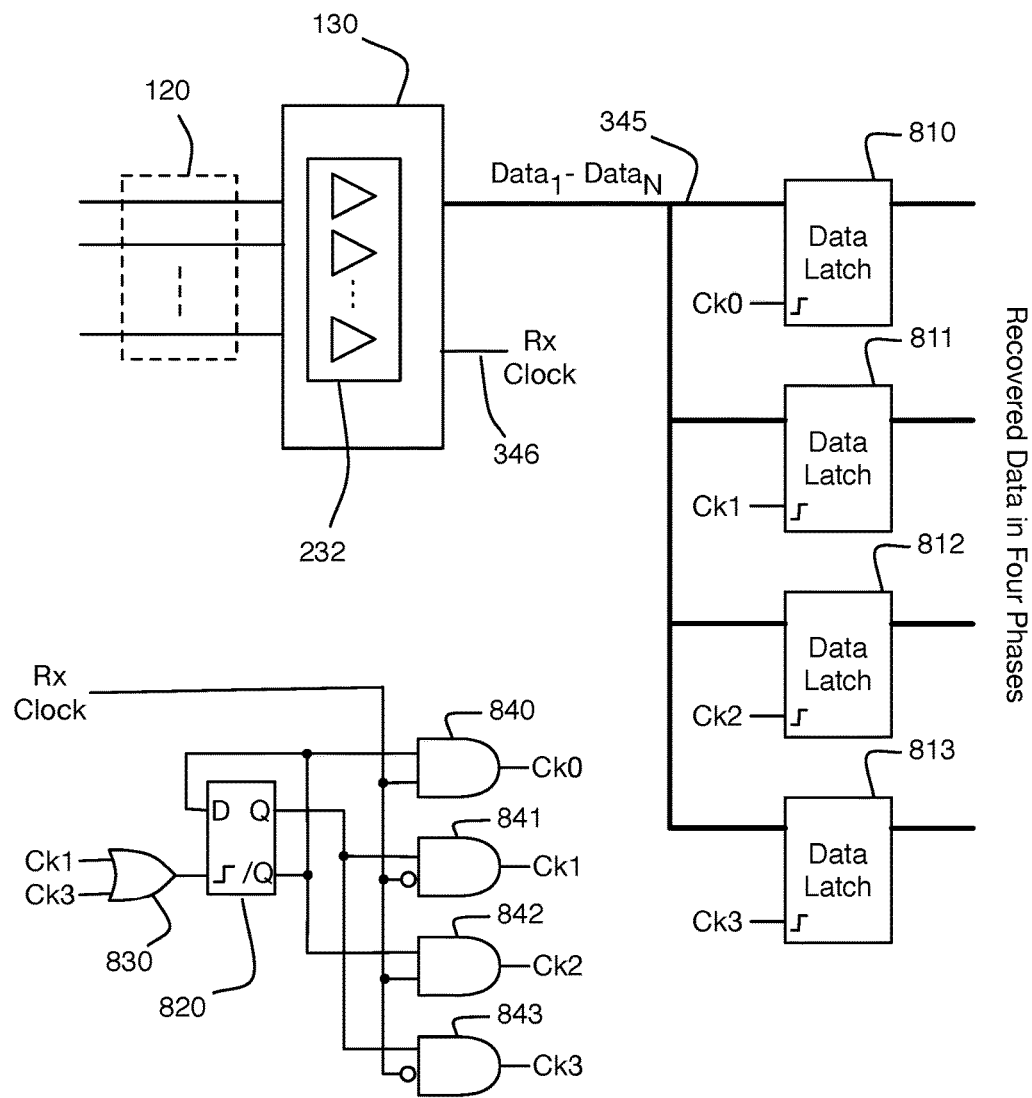
FIG. 9 illustrates an embodiment of a receiver incorporating multi-phase processing.

The example receiver subsystem 390 of FIG. 3 is further illustrated in the example embodiment of FIG. 9 incorporating multi-phase receive processing as may be utilized in DRAM designs. In such an embodiment, the clocked flip-flops (810-813 as examples) available do not operate quickly enough to capture received data on consecutive unit intervals.

Operation of the receiver is as previously described, with signals received from interconnection 120 detected by receiver 130 which incorporates Multi Input Comparators 232, resulting in detected subchannels carrying signals $Data_1$-$Data_N$ 345 and clock signal Rx Clock 346. To capture signals $Data_1$-$Data_N$ at full speed, four distinct sets of flip-flops 810, 811, 812, 813 are used as Data Latches clocked by non-overlapping and sequentially activating clocks Ck0, Ck1, Ck2, and Ck3 respectively, causing data to be latched by latches 810 on the first rising edge of Rx Clock, by 811 on the first falling edge of Rx Clock, by 812 on the subsequent rising edge of Rx Clock, and by 813 on the subsequent falling edge of Rx Clock. The clock signals are steered in this manner by the combination of Flip-Flop 820 and AND gates 840, 841, 842, 843. OR gate 830 causes Flip-Flop 820 to toggle after activation of Ck1 and Ck3, insuring that the sequence will continue as described. Numerous other equivalent embodiments are known in the art, as are embodiments utilizing fewer or greater numbers of data latch phases, which may be applied in any combination with the described embodiments.

Hybrid Embodiments

For descriptive purposes, this document will use the term "independent subchannel" for encoder embodiments of the type shown in FIG. 5, absent any timing constraints (e.g. such as clocked latches) that would impact the arbitrary phase relationship among communicated signals as described.

One must acknowledge that a number of useful implementation techniques become unavailable in a purely asynchronous embodiment as described above. Thus, it is useful to consider what will hereafter be called "hybrid subchannel" embodiments, in which some portion of the data path is clocked, while other portions are asynchronous (i.e. representing multiple clock domains.)

In one embodiment utilizing such a configuration illustrated in FIG. 6, the codeword encoder 610 processing the data will output a data-modulated codeword 613 representing a weighted summation of the data modulated subchannels, absent the subchannel used for clock information. The subchannel used for clock information is separately encoded using an independent subchannel encoder 512 producing a clock-modulated codeword 513, the data-modulated codeword and the clock-modulated codeword being added 514 in an asynchronous codeword generator configured to generate an asynchronous-transmit codeword 515. Symbols of this asynchronous-transmit codeword are then converted to analog signal values 516 and output 518 as analog physical signals onto a multi-wire bus as previously described relative to FIG. 5. Other embodiments may combine elements, as combining summation 514, conversion 516, and output 518 in an output subsystem such as an output driver. In an alternate embodiment utilizing such a configuration, the digital encoder processing the data 610 is configured as if the data input corresponding to the subchannel used for the clock information were fixed at a constant value, e.g., zero. The clock modulated codeword 513 being added (as one example, within said output driver performing the combined operations 514, 516, 518) is then configured to represent differences from the fixed or default data-modulated subchannel values already present in that first result.

It will be readily apparent to one familiar with integrated circuit design that other embodiments providing such hybrid summed channel operation are possible: Data values representing subsets of all available subchannels and encoded as codewords using clocked logic may be converted to analog values which are then summed with analog values derived from un-clocked encoding of other subchannels of data and/or clocks having arbitrary phase relationships. For purely digital embodiments, the alphabet representing values in a codeword and/or the values representing an asynchronously encoded clock or data subchannel may be encoded using a digital counting sequence immune to timing-related glitches, such as a grey code, one-hot code, or other digital encoding known in the art. Such sequences can be combined and used to generate a summed output value using well known digital-to-analog methods known in the art, with minimal risk of generating an incorrect output value because one or both of the input values was changing during the combining operation. In an alternative embodiment, known art "clock free" or asynchronous logic design methods may be used solely within the final combining element, producing a digital summation of the subchannel input values regardless of their source timing relationships. In a further alternative embodiment, the well-known method of capturing the two input values in retiming latches to eliminate metastable or transient input states is applied, prior to conventional summation and conversion to an output value suitable for driving the output wires.

Hybrid Subchannel Combination in an Output Driver

The Glasswing embodiment described in [Hormati I] utilizes an ODVS code to communicate five data bits over a six wire communications channel, further utilizing a two wire communications channel to communicate a reference clock signal. Both the transmitter and receiver incorporates multiple parallel processing phases in its data path to achieve exceptionally high data rates, multiplexing into and out of these multiple phases being performed by high speed clocks. Thus, reimplementation of the Glasswing design as a purely asynchronous linearly summed subchannel embodiment would be quite difficult.

However, the line driver incorporated in at least one Glasswing embodiment is based on that of [Ulrich II], herein called an Ulrich-type driver, being comprised of multiple instances of relatively low power binary signal drivers configured to operate essentially in parallel, each such driver being capable of injecting a controlled amount of current into the common and resistively terminated output wire. The ODVS encoder is configured to output multiple binary control signals per codeword symbol, each such signal controlling different sets of line drivers within a given driver instance. Thus, a given codeword symbol may enable different sets and different numbers of paralleled line drivers, resulting in the production of different output signal levels for each codeword symbol.

Figure 7:
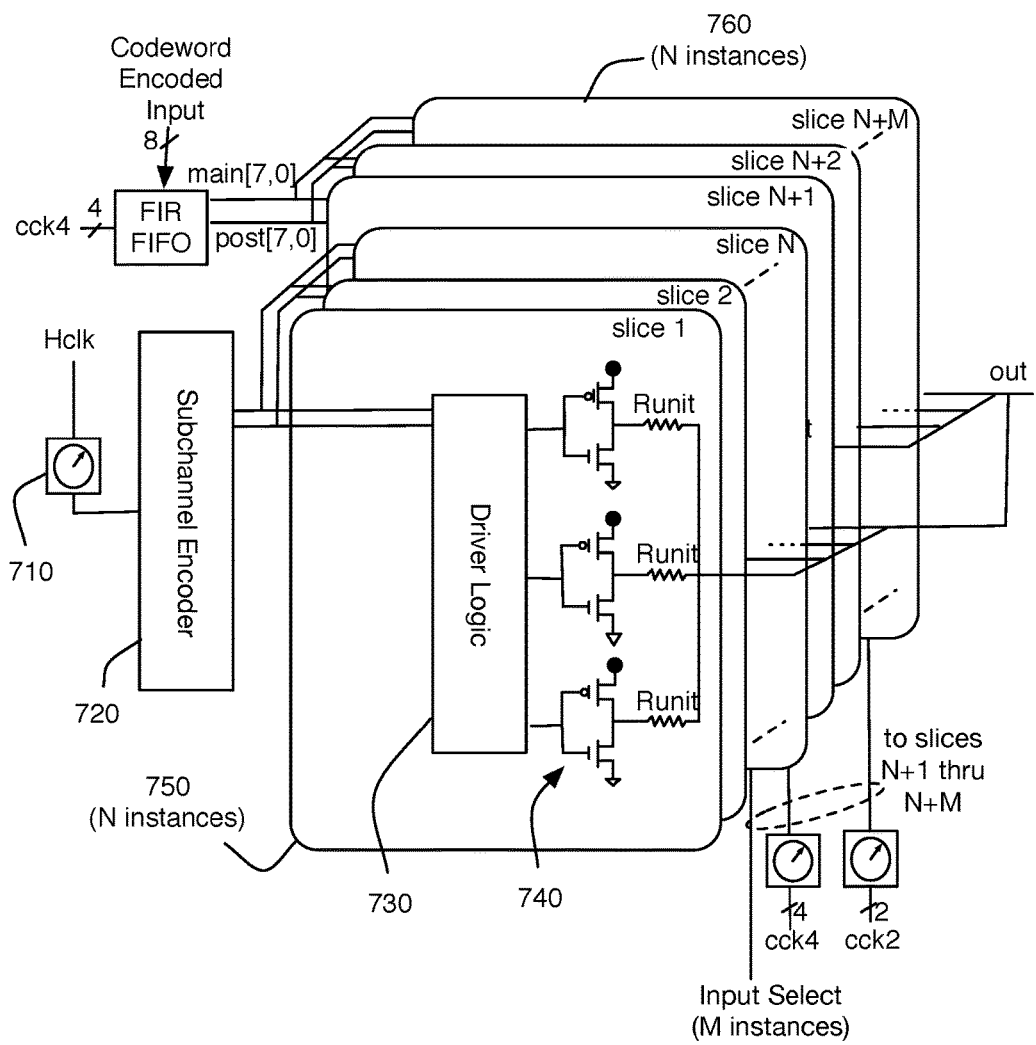
FIG. 7 illustrates an Ulrich-style driver configured to combine a subchannel-encoded clock signal and codeword-encoded data onto the same wire.

The description of [Ulrich II] presumes that data-modulated codeword symbols are provided to the driver from multiple parallel processing instances combined by a clocked multiplexor. However, it is both possible and practical to reserve some number of Ulrich-type output driver instances and assign them to a separate signal source, one such embodiment incorporating an un-clocked subchannel encoder instance modulated by a clock signal having an arbitrary phase relationship with the clocked data signals, as illustrated in FIG. 7. The illustrated embodiment accepts clock signal Hclk having an arbitrary phase relationship to data and/or codeword-encoded data transitions (as illustrated by the clock signal passing through phase delay 710), encoded as modulation of a single subchannel 720 and presented to N output driver slices or instances 750. Within each of said M instances, Driver Logic 730 controls each of the individual output drivers as 740 to produce a common output signal. The data path is unchanged from its description in [Ulrich II], with N output driver instances 760 being controlled by encoded data and Finite Impulse Response (FIR) variations of said encoded data.

Figure 8:
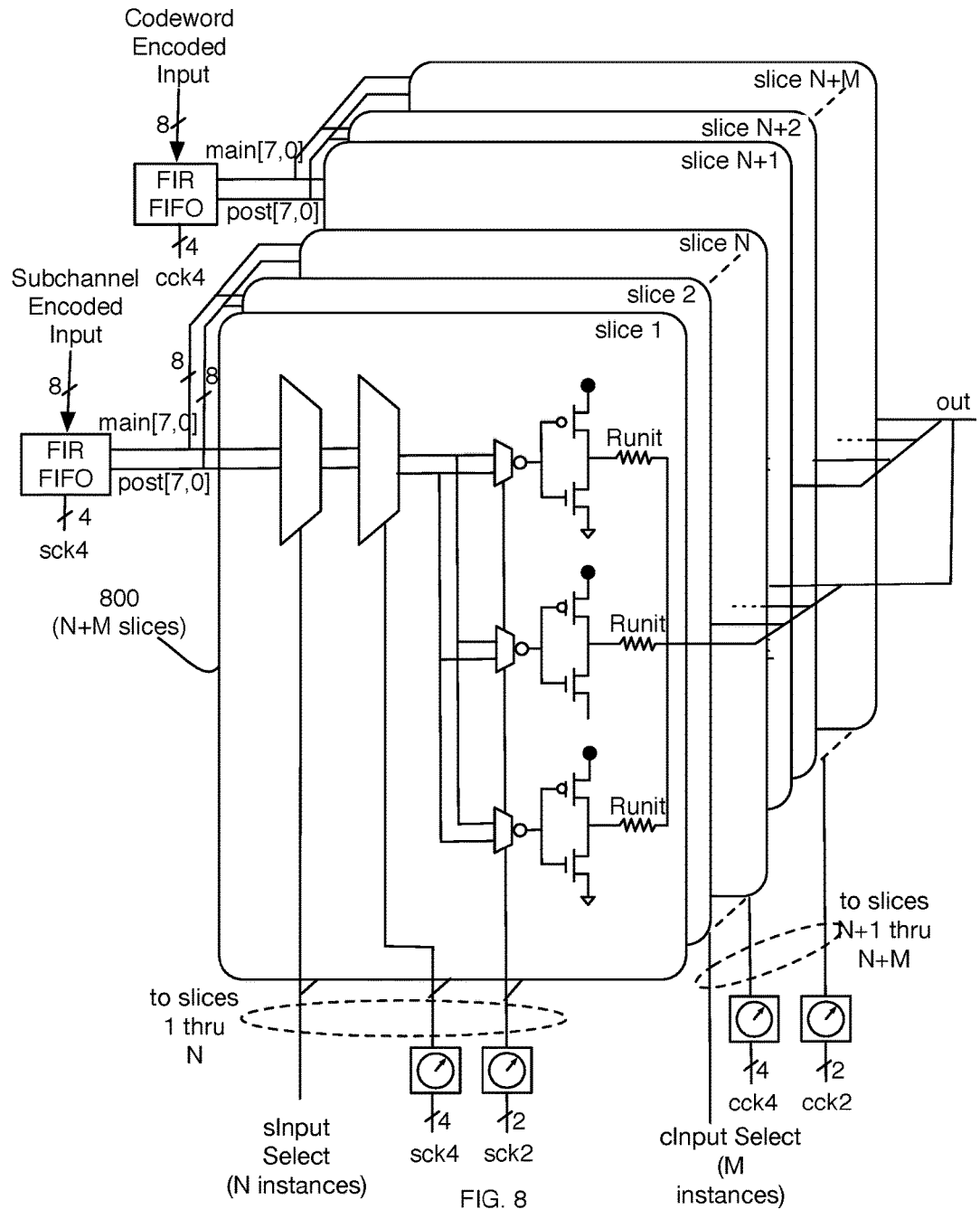
FIG. 8 illustrates an Ulrich-style driver configured to combine codeword-encoded and subchannel-encoded signals from different clock domains onto the same wire.

Another such embodiment incorporating a clocked subchannel encoder instance operating in a different clock domain from the clocked data signals is illustrated in FIG. 8 (also derived from a drawing in [Ulrich II]) where N output driver slices are assigned to a clock-modulated subchannel encoded input, while M output driver slices remain assigned to a data-modulated codeword encoded input as in the original Ulrich design. For generality, each of the N slices is shown as including phase demultiplexing circuits driven by clocks sclk4 and sclk2, of the subchannel encoding clock domain. Conversely, each of the M slices includes phase demultiplexing circuitry driven by clocks cclk4 and cclk2, of the codeword encoder clock domain.

As will be obvious to one familiar with circuit design, other embodiments may eliminate unnecessary demultiplexing because parallel clock processing phases are not necessary, unneeded FIR shaping is removed, etc. Regardless of such variations, the multiple paralleled instances of the output drivers driving common wire outputs effectively obtain the desired summation of the clock-modulated and data-modulated elements; e.g. the independent subchannel or separate clock domain modulated subchannel carrying the clock, and the codeword-modulated subchannels carrying the data.

It should be noted that any of the described hybrid solutions that generate an intermediate analog value prior to the actual output driver may require some form of linear amplification of that value to drive the output wires. Power consumption and integrated circuit area for such an amplifier may be significant in some embodiments. The described hybrid Ulrich-type driver avoids these issues by performing the combination within the output driver itself.

Similarly, hybrid solutions encoding the required output value digitally and then converting the result at the output, as one example using a D-to-A converter design capable of driving the considerable output load of the signal wires, may need to support a significant number of bits of resolution (e.g. a large alphabet of output values) so as to accurately reproduce the summation of all modulated subchannels regardless of the phase of their modulations.

The examples presented herein illustrate the use of vector signaling codes for point-to-point half-duplex or unidirectional wire communications. However, this should not been seen in any way as limiting the scope of the described embodiments, as the described methods and apparatus may be equally well applied to multi-drop and/or duplex communications environments. The methods disclosed in this application are equally applicable to other communication media including optical and wireless communications. Thus, descriptive terms such as "voltage" or "signal level" should be considered to include equivalents in other measurement systems, such as "optical intensity", "RF modulation", etc. As used herein, the term "physical signal" includes any suitable behavior and/or attribute of a physical phenomenon capable of conveying information. Physical signals may be tangible and non-transitory.

I claim:

1. A method comprising:
generating, using a plurality of sets of output driver slices, a plurality of analog output signals corresponding to symbols of a data-modulated codeword of a vector signaling code, each analog output signal generated by a respective set of output driver slices receiving a respective data-modulated codeword encoded input;
generating, using a plurality of sets of clock-modulated driver slices, a plurality of signals of a clock-modulated subchannel onto the wires of the multi-wire bus, each signal of the plurality of signals of the clock-modulated subchannel driven by a respective set of clock-modulated driver slices receiving a respective clock-modulated subchannel input;
forming signals of an asynchronous-transmit codeword on each wire of the multi-wire bus, each signal of the asynchronous-transmit codeword formed as an analog summation of (i) an analog output signal of the plurality of analog output signals and (ii) a corresponding signal of the plurality of signals of clock-modulated subchannel; and
transmitting the signals of the asynchronous-transmit codeword over the multi-wire bus.

2. The method of claim 1, wherein the respective clock-modulated subchannel input is derived from a clock signal and wherein the respective data-modulated codeword encoded input is derived from one or more data signals.

3. The method of claim 2, wherein the clock signal has a phase offset with respect to a phase of the one or more data signals.

4. The method of claim 3, wherein the phase offset is a half-unit interval delay with respect to the phase one or more data signals.

5. The method of claim 2, wherein the one or more data signals are synchronous.

6. The method of claim 2, wherein the one or more data signals correspond to a single data phase of a plurality of data phases.

7. The method of claim 1, wherein each set of output driver slices of the plurality of output driver slices further comprises one or more output driver slices for receiving a data-modulated codeword encoded input derived from symbols transmitted in a previous unit interval.

8. The method of claim 1, wherein each set of output driver slices of the plurality of output driver slices comprises one or more output driver slices for receiving a data-modulated codeword encoded input derived from symbols to be transmitted in a subsequent unit interval.

9. The method of claim 1, wherein the asynchronous-transmit codeword is a permutation of $\{+1, -\frac{1}{3}, -\frac{1}{3}, -\frac{1}{3}\}$ or $\{-1, \frac{1}{3}, \frac{1}{3}, \frac{1}{3}\}$.

10. The method of claim 1, wherein the respective data-modulated codeword encoded input is a multi-bit input indicative of a symbol value of at least a quaternary alphabet.

11. An apparatus comprising:
a plurality of sets of output driver slices, each set of output driver slices of the plurality of output driver slices configured to receive a respective data-modulated codeword encoded input and to responsively generate an analog output signal of a plurality of analog output signals on respective wires a multi-wire bus, the analog output signals corresponding to respective symbols of a data-modulated codeword of a vector signaling code; and
a plurality of sets of clock-modulated driver slices, each set of clock-modulated driver slices configured to receive a respective clock-modulated subchannel input and to responsively generate a plurality of signals of a clock-modulated subchannel on respective wires of the multi-wire bus;
the multi-wire bus configured to form signals of an asynchronous-transmit codeword, each signal of the asynchronous codeword formed as an analog summation of (i) an analog output signal of the plurality of analog output signals and (ii) a corresponding signal of the plurality of signals of the clock-modulated subchannel, the signals of the asynchronous-transmit codeword transmitted over respective wires of the multi-wire bus.

12. The apparatus of claim 11, wherein the respective clock-modulated subchannel input is derived from a clock signal and wherein the respective data-modulated codeword encoded input is derived from one or more data signals.

13. The apparatus of claim 12, wherein the clock signal has a phase offset with respect to a phase of the one or more data signals.

14. The apparatus of claim 13, wherein the phase offset is a half-unit interval delay with respect to the phase of the one or more data signals.

15. The apparatus of claim 12, wherein the one or more data signals are synchronous.

16. The apparatus of claim 12, wherein the one or more data signals correspond to a single data phase of a plurality of data phases.

17. The apparatus of claim 11, wherein each set of output driver slices of the plurality of output driver slices further comprises one or more output driver slices configured to receive a data-modulated codeword encoded input derived from symbols transmitted in a previous unit interval.

18. The apparatus of claim 11, wherein each set of output driver slices of the plurality of output driver slices further comprises one or more output driver slices configured to receive a data-modulated codeword encoded input derived from symbols to be transmitted in a subsequent unit interval.

19. The apparatus of claim 11, wherein the asynchronous-transmit codeword is a permutation of $\{1, -\frac{1}{3}, -\frac{1}{3}, -\frac{1}{3}\}$ or $\{-1, \frac{1}{3}, \frac{1}{3}, \frac{1}{3}\}$.

20. The apparatus of claim 11, wherein the respective data-modulated codeword encoded input is a multi-bit input indicative of a symbol value of at least a quaternary alphabet.

* * * * *